United States Patent [19]

Petro

[11] Patent Number: 5,242,134
[45] Date of Patent: Sep. 7, 1993

[54] SPACE STATION TRASH REMOVAL SYSTEM

[75] Inventor: Andrew J. Petro, Houston, Tex.

[73] Assignee: The United States of America as represented by the Administrator of the National Aeronautics and Space Administration, Washington, D.C.

[21] Appl. No.: 887,001

[22] Filed: May 22, 1992

[51] Int. Cl.$^5$ .............................................. B64G 1/22
[52] U.S. Cl. ................................. 244/158 R; 244/160
[58] Field of Search .................... 244/158 R, 159, 160, 244/138 R, 118.5

[56] References Cited

U.S. PATENT DOCUMENTS

| | | | |
|---|---|---|---|
| 3,421,714 | 1/1969 | Koerner | 244/1 |
| 3,514,056 | 5/1970 | Sloan, Jr. et al. | 244/138 |
| 4,005,655 | 2/1977 | Kleinschmidt et al. | 102/4 |
| 4,166,597 | 9/1979 | Seifert et al. | 244/160 |
| 4,166,598 | 9/1979 | Seifert et al. | 244/160 |
| 4,518,137 | 5/1985 | Andrews | 244/113 |
| 4,549,464 | 10/1985 | Hawkins et al. | 89/1.809 |
| 4,565,341 | 1/1986 | Zacharin | 244/113 |
| 4,832,288 | 5/1989 | Kendall et al. | 244/160 |
| 4,958,565 | 9/1990 | Koch | 102/386 |

FOREIGN PATENT DOCUMENTS

| | | | |
|---|---|---|---|
| 3934346 | 4/1991 | Fed. Rep. of Germany | 244/160 |
| 1485587 | 5/1967 | France | 244/158 R |

OTHER PUBLICATIONS

Anderson, "Space Station Integrated Refuse Management Sys" NASA CR-184722 May 1988, pp. i-xi, 121-133, 136, 138, 140, 143-146, 148-150 153 155 158.
Hinson, "The Disposal of Nuclear Waste: The Space Option" Spaceflight vol. 22, #4, Apr. 1980.
NASA Facts vol II-2 1964.

*Primary Examiner*—Galen Barefoot
*Attorney, Agent, or Firm*—Hardie R. Barr; Guy M. Miller; Edward K. Fein

[57] ABSTRACT

A trash removal system for space stations has a disposable trash bag member and an attached, compacted large, lightweight inflatable balloon element. When the trash bag member is filled, the astronaut places the bag member in space through an airlock. Once in the vacuum of space, the balloon element inflates. Due to a large cross-sectional area of the balloon element relative to its mass, the combined balloon element and the trash bag member are slowed by atmospheric drag to a much greater extent than the Space Station. The balloon element and bag member lose altitude and re-enter the atmosphere and the elements and contents are destroyed by aerodynamic heating.

4 Claims, 1 Drawing Sheet

SPACE STATION TRASH REMOVAL SYSTEM

ORIGIN OF THE INVENTION

The invention described herein was made by an employee of the United States Government and may be manufactured and used by or for the Government of the United States of America for government purposes without the payment of any royalties thereon or therefor.

FIELD OF THE INVENTION

This invention relates to an aerospace system for the disposal of waste materials and other unwanted objects from a space station or space craft at a low earth orbit.

BACKGROUND OF THE INVENTION

Manned orbiting space stations (and spacecraft generally) have very limited internal volume for the crew. Over a period of time waste material and unwanted objects such as food packaging, failed equipment, experimental by-products, human waste, used filters and so forth are generated and use up available space. It is a desirable advantage to be able to dispose of such waste material during a mission so as not to proliferate or increase space debris by ejecting it into space or requiring it to be stored in the spacecraft.

The reason that waste material cannot simply be ejected into space is that such ejected waste material occupies a volume and a trajectory for a time period and can be a hazard to existing and future space missions because of "hard body" impacts where one solid high velocity body mass impacts with another solid high velocity body mass which produces smaller and more numerous high velocity debris elements from the larger debris body masses. The obvious proliferation of debris in this manner reduces "free" space and increases the hazards of future space operations which will encounter such debris. Space debris has a relatively long life and thus presents a problem of removal from space.

Orbital lifetime for a space object if not restricted can range into hundreds of years. The lifetime is a function of energy. As an orbiting object loses energy principally through friction, in time it will descend to progressively lower orbits and eventually fall to earth. PRIOR PATENT ART U.S. Pat. No. 3,421,714 (Class 244/1) issued to W. G. Koerner on Jan. 14, 1969 relates to a passive vehicle for conveying small payload packages or capsules from a space vehicle to the earth. The vehicle is comprised of a storage tank 10, radial fins 11 and a bead 12 on the outer edges of the fins 11. The bead 12 or the fins are arranged to rotate the tank 10 about its longitudinal axis during re-entry to alleviate heating problems and discourage a tumbling action. The fins are also intended to cushion the tank upon ground impact.

U.S. Pat. No. 4,518,137 (Cl 244/133) issued to D. G. Andrews on May 21, 1985 teaches that recovery of a space vehicle is enhanced by use of a braking or drag member. As a spacecraft is guided towards re-entry and approaches the earth atmosphere it is oriented to have the nozzle of the main rocket motor leading. The braking member is deployed and the rocket motor is operated to provide a cooling layer of gases and change the velocity of the space vehicle. When the vehicle is slowed down to a proper velocity, the braking member is jettisoned.

U.S. Pat. No. 4,549,464 (Class 89/1809) issued to D. K. Hawkinson Oct. 29, 1985 relates to an inflatable shroud which is compacted within an available cylinder or silo volume and inflated by a gas generator to an aerodynamic shape.

U.S. Pat. No. 4,832,288 issued to R. T. Kendall et. al. on May 23, 1989 relates to a recovery system which has an inflatable torus system which can be deployed to decelerate a vehicle reentry into the atmosphere. Explosive squib bolts or the like are operated to open the closure for the torus device.

Other patents showing drag devices include the following:

U.S. Pat. No. 4,958,565 issued to M. A. Koch on Sep. 14, 1990, relates to a decelerator for stabilizing the drop of a bomb from an aircraft. The problem set forth in the patent is the wide disparity between the aircraft ejection speed and the descent speed which can damage the bomb or the parachute. The disclosure describes a triangular shape which has scoops to inflate the interior chamber between front and rear panels of the decelerator.

U.S. Pat. No. 4,005,655 issued to N. Kleinschmidt on Feb. 1, 1977 relates to an aerodynamic stabilizer and retarder apparatus for use with free fall weapons. The problem is bomb delivery from high speed low level aircraft. A fabric bag is inflated by ram air after the bomb is launched and air scoops provide a drag. The drag can be varied by the use of other drag members.

U.S. Pat. No. 4,565,341 issued at A. T. Zacharin on Jan. 21, 1986 discloses a collapsible decelerator for an aerial bomb which has a star shaped hollow member.

U.S. Pat. No. 3,514,058 issued to G. J. Sloan on May 26, 1970 relates to a combination self inflating retardation and flotation device for recovery of instrumentation packages descending from a high attitude. The device includes a pear shaped bag construction with shroud lines 34 which converge to a riser line 38. In operation atmospheric air inflates the bladder 14 and a skirt member 22 is inflated and upon engagement with water limits the depth of submergence.

METHODS OF TRASH DISPOSAL

One method for trash disposal from a Space Station is to carry the trash away in a logistics container in the Space Shuttle and return it to Earth. The disadvantage to this method is that the Shuttle is an expensive form of transportation and its return payload capability is less than its delivery capability and so using the Shuttle to return payload with no real value is inefficient. Also, trash removal is limited to the infrequent visits of the Space Shuttle.

Another method for trash removal is to use an orbital maneuvering vehicle (OMV) to place the packaged trash on a re-entry trajectory. However, OMV operations will be expensive and it may be difficult to justify use of an OMV for trash disposal, as with the Shuttle. Also, using the OMV to place a package on a re-entry trajectory puts the OMV at risk of re-entry also which would be an expensive loss. An alternative would be a special expendable OMV for trash removal but this would involve relatively expensive and probably hazardous devices which would have to be delivered as part of the Station supplies and stored at the Station for long periods.

Of course, the trash can be stored at the station indefinitely. However, long-term storage uses up very valuable on-board space, adds to the mass of the Station, and possibly presents a health hazard.

Still another system is to eject the packaged trash from a Station to place it on a re-entry trajectory. However, this involves adding a special mechanism to the station which might be hazardous to operate and which might create undesirable acceleration loads on the Station.

Finally, trash can be dumped outside the station. However, this would create a debris hazard to the station and other spacecraft and could interfere with station activities.

PRIOR LITERATURE

Various papers have been written on space debris and removal. Discussions of debris in space can be found in
1. Report on Orbital Debris by the Interagency Group for the National Security Council, Washington, D.C. in February 1989;
2. Future Space Transportation requirements for the management of Orbital Debris, paper #1AF89-244 presented on Oct. 7-12, 1989 in Malaga, Spain at the 40th Congress of the International Astronautical Federation;
3. U.S. Studies in Orbital Debris, paper #1AF90-564 presented in Oct. 6-12, 1990 in Dresden, GDR at the 41st Congress of the International Astronautical Federation;
4. Orbital Debris from Upper Stage Breakup, Chapters 10, 11 Volume 121 of Progress in Astronautics and Aeronautics published by the AIAA Inc. of Washington, D.C.
5. United States Studies in Orbital Debris Prevention and Mitigation, paper #1AF-90-646 presented Oct. 6-12, 1990, Dresden, GRR. 41st Congress of the International Astronautical Federation.
6. Decision time orbital debris, published in June 1988 in Aerospace America, pages 16-25.

SUMMARY OF THE PRESENT INVENTION

The system of the present invention for trash removal includes a disposable bag for containing the trash or waste generated in a spacecraft or a space station. The bag is connected to a compacted large, lightweight inflatable balloon element while in the spacecraft. The trash bag would be filled with waste material inside the station and the balloon element remains compacted until ready for use.

The bag is made of a heavy plastic or cloth material and has vent holes to ensure that air can escape once the bag is released in the vacuum of space. The balloon element is made of Mylar or a similar material and attached to the outside closed end of the trash bag. In packaging the balloon element to a compacted configuration, enough air is left in the folds of the balloon element to allow for its complete inflation once it is released in space. Alternatively, a subliming agent can be utilized.

For disposal, after the trash bag is full, the trash bag is clamped shut and transported to an airlock. Another clamp which prevents the opening of the compacted balloon element is removed and the bag and balloon element are deposited into space from an airlock hatch in a direction opposite to the velocity vector of the Space Station. Once in a vacuum, the balloon element inflates. Due to a large cross-sectional area of the balloon element relative to its mass, the combined balloon element and the trash bag are slowed by atmospheric drag to a much greater extent than the Space Station. The balloon element and bag loses altitude and re-enters the atmosphere and the elements and contents are destroyed by aerodynamic heating.

DESCRIPTION OF THE PRESENT INVENTION

Figure 1:
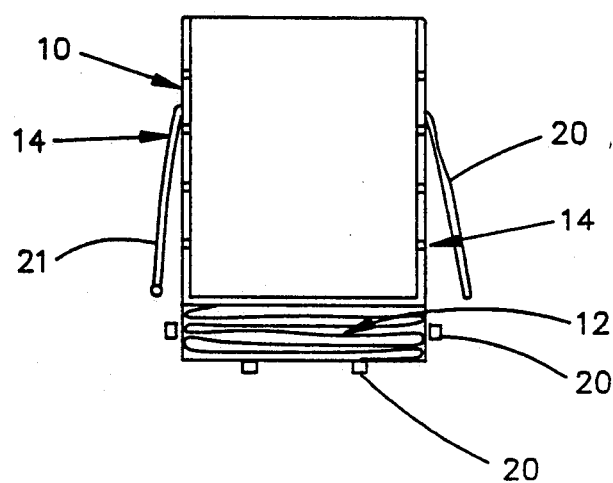
FIG. 1 is a view in cross-section of a trash bag with a collapsed balloon element.
Figure 3:
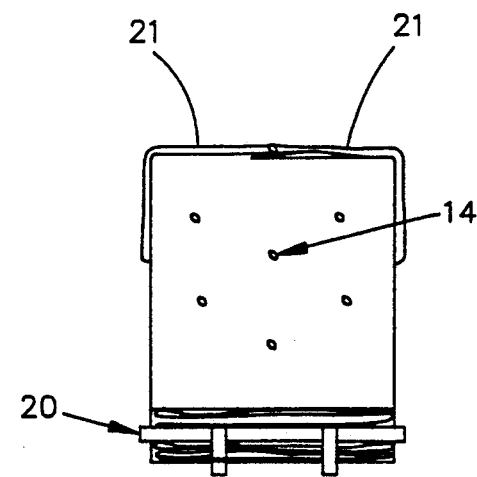
FIG. 3 is a view of a trash bag prior to disposal in space.

In the present invention, an elongated cylindrically shaped trash bag member 10 is schematically illustrated in FIG. 1. At a bottom end of the trash bag member 10 is a compacted balloon element 12. The bag member and balloon element 12 are intended to be carried in a space station and utilized for the collection of trash or waste materials or equipment. The bag member 10 is made of a heavy plastic or cloth material with sufficient sturdiness to contain the waste load. It may be either stiff, semi-flexible or flexible. About the wall of the bag member 10 are vent openings 14 which insure that air trapped within the bag member in the space station can escape once the bag member is released into the vacuum of space.

The balloon element 12 is large and lightweight and is made from thin film Mylar (TM) or a similar material and might have an outer aluminum coating 15 for tracking purposes. In a space station, the balloon element 12 is in a folded and compacted condition. The balloon element is initially maintained in the compacted condition by a retaining means 20 which can be cross connected straps or the like. In folding the balloon element to a compacted condition, enough air is left in the interior of the balloon element to inflate the balloon in space yet permit folding to the compacted condition. The retaining means 20 are released when the bag element and balloon element are ejected into space from the space station.

Figure 2:
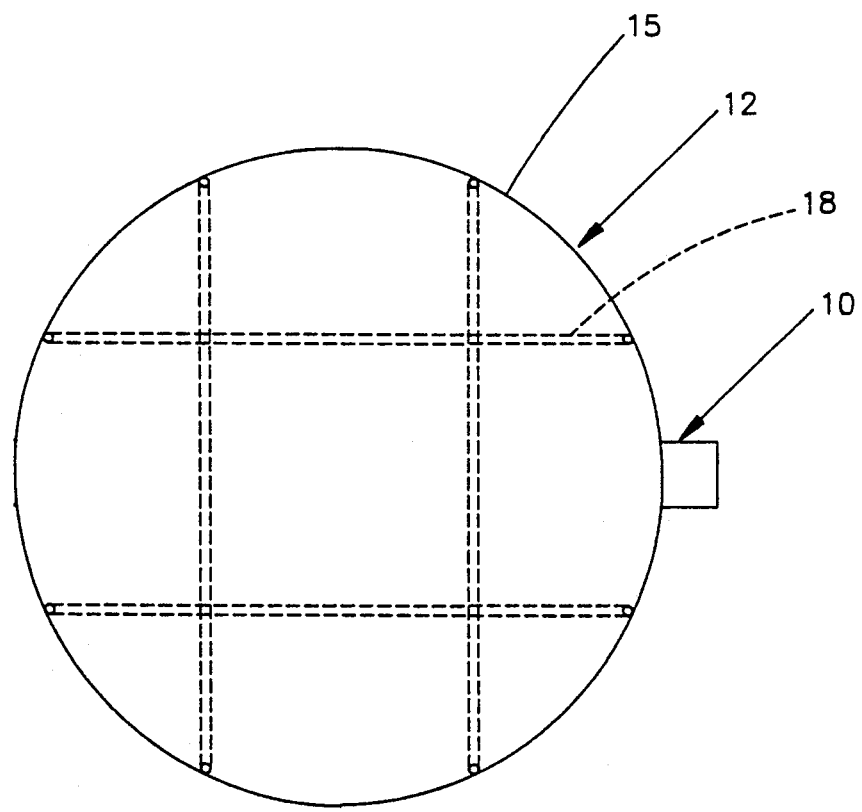
FIG. 2 is a view of an inflated balloon element.

The balloon element 12, when inflated has a spherical configuration. Air inflation is simple to implement, however a subliming agent can be used for inflation, if desired. For example, U.S. Pat. Nos. 3,282,533 and 4,394,998 disclose suitable subliming agents as well as wall rigidizing means. In this regard, if desired, other rigidizing means are readily apparent such as Nitinal (TM) wire rings (See FIG. 2, shown in dashed line).

In relation to the design of the bag element and balloon element, it has been estimated that a future space station will generate about 3000 pounds of trash per month. The volume of this material was estimated using a combination of densities for air, water, paper, plastic, and aluminum. The estimated density is 40 lbs/cu.ft. The volume of trash generated in a month is then 75 cu.ft. This volume on a monthly basis would equate to a cylinder 4 ft. in diameter and 6 ft. long. This size for a trash bag should hold up to 3000 lbs of trash.

The size of the attached balloon element is a function of the time required for reentry. In order to estimate the size of an example balloon a re-entry time of 90 days and a starting orbital altitude of about 270 nmi is chosen. The orbital altitude is a conservative estimate since a U.S. Station will probably operate no higher than 220 nmi. Based upon this information, the balloon element should be 50 ft. in diameter. The balloon mass would be about 35 lbs (using material similar to the Echo balloon from the early 1960's). The balloon element is stored with a cylindrical shape at the bottom of the trash bag with a diameter of 4 ft (just like the trash bag) and have a thickness of 4 inches. While one balloon element is discussed, several smaller balloons could be used rather than one large balloon.

When the trash bag member is full, the top of the bag member is folded to enclose the open end and straps 21 are used to prevent opening of the bag. If desired, clamps can be integrated with the wall of the bag element. The astronaut in a pressure suit takes the bag to an airlock where the clamp means 20 is removed from the balloon element 12 and the unit is thrown into space from the airlock latch in a direction opposite to the velocity vector of the Space Station. Once in the vacuum of space, the balloon element inflates. Due to the large cross-sectional area of the balloon element relative to its mass, the velocity of the balloon element and the bag member are reduced by the atmospheric drag.

Instead of ejecting the trash bag and balloon element from the space station, it can be used in conjunction with the Shuttle or OMV. In this use, the trash bag is carried away in the Shuttle payload bay and released at some distance from the station before the Shuttle returns to Earth. Likewise, the OMV could be used to carry the bag some distance away from a space station and then release the bag.

The system also has utility with the Shuttle and other spacecraft as a means of disposal of excess materials before returning to Earth, which will reduce landing weight of the Shuttle or other space craft.

Additionally, if the Space Shuttle is used to remove trash from a Station in logistics modules, this system can still be used as a contingency method of disposal because it does not have any significant weight or volume penalty.

Coating the balloon with a thin layer of aluminum would aid in radar tracking. An added scientific benefit is provided in that the trash containers, with their known mass and dimensions, can be tracked during their decay and entry and provide data on the nature of the upper atmosphere. This is important because the characteristics of the atmosphere change over time so monitoring the orbital behavior of the trash containers would provide an additional reference for studying atmospheric conditions.

The system is simple, passive, and reliable. Compared to an ejection device or expandable OMV, it is small and lightweight to deliver and store at the station. Using this system means that trash can be disposed of as required and is not linked to the schedule of Shuttle flights or the availability of the OMV.

The use of this system does not involve any expensive hardware as would be the case with a propulsive device. Also, the balloon element is passive and requires no control system to maintain stability. For this reason it is safe to store in habitable areas and deploy manually.

Unlike an ejection system, this device does not require any special provisions or equipment on the Station. All that is needed is the existing airlock and an astronaut in a pressure suit. It is not subject to any mechanical or electrical malfunctions. Also, the device could be used on any type of low Earth orbit space facility or spacecraft with no modifications.

It will be apparent to those skilled in the art that various changes may be made in the invention without departing from the spirit and scope thereof and therefore the invention is not limited by that which is disclosed in the drawings and specifications but only as indicated in the appended claims.

I claim:

1. A trash disposal system for space operations including
    a bag member constructed and arranged from a heat destructible material to contain waste materials generated in a spacecraft;
    an airlock contained in the spacecraft;
    a compacted balloon element attached to said bag member, said compacted balloon element being compacted so as to entrap a gas in the folds of the balloon element;
    releasable means for retaining said balloon element in a compacted condition in a spacecraft;
    said balloon element being expandable to an inflated condition upon expansion of the entrapped gas when released from a spacecraft through the airlock, said balloon element in an inflated condition having a volume relative to the combined mass of balloon and bag member, said volume relative to mass being sufficient for inducing atmospheric drag to slow said balloon and bag member relative to the spacecraft and separate the balloon and bag member from the spacecraft and for accelerating re-entry of said balloon and bag member into the atmosphere for destruction by aerodynamic heating.

2. The system as set forth in claim 1 and further including a metalized coating on said balloon element for space tracking purposes.

3. The system as set forth in claim 1 including vent holes in said bag member.

4. A method of trash disposal from a spacecraft where the spacecraft carries an inflatable balloon element attached to a trash bag member, the method comprising:
    compacting the balloon element so as to entrap gas within the folds of the compacted balloon element, the entrapped gas being sufficient in quantity to inflate the balloon element in the vacuum of space to a desired volume;
    constraining the balloon element against inflation prior to deployment;
    placing trash to be disposed into trash bag member;
    closing off the trash bag member prior to disposal;
    releasing the constraint on balloon element;
    exposing the trash bag member and attached balloon element to the vacuum of space;
    releasing the trash bag member and attached balloon element through an air lock in a direction opposite to the velocity vector of the spacecraft;
    allowing the entrapped gas to inflate the balloon element to a volume having sufficient atmospheric drag to slow the velocity of the trash bag member and attached balloon element relative to the spacecraft and separate the trash bag member and balloon element from the spacecraft.

* * * * *